United States Patent Office 2,996,532
Patented Aug. 15, 1961

2,996,532
CARBONYL-SUBSTITUTED ALKYL N,N'-TRIALKYLPHOSPHORODIAMIDODITHIOATES
Allen F. Millikan, Crystal Lake, and Gifford W. Crosby, River Forest, Ill., assignors to The Pure Oil Company, Chicago, Ill., a corporation of Ohio
No Drawing. Filed Nov. 15, 1957, Ser. No. 696,604
20 Claims. (Cl. 260—461)

This invention relates to new compositions of matter, their method of preparation, and to lubricating oil compositions comprising or containing the products thereof, namely, carbonyl-substituted alkyl phosphoroamidothioates, particularly phosphorodiamidodithioates.

In copending application Serial Number 630,088 filed December 24, 1956, now Patent No. 2,948,682 certain formylalkyl thiophosphate esters are described which are prepared by the reaction of an O,O-diester of a dithiophosphoric acid with an alkenal such as acrolein, crotonaldehyde, 2-pentenal, etc. The reaction is carried out in such a manner that instead of condensation, wherein the alkenal serves to provide a linking nucleus between the thiophosphate esters, and the oxo group of the aldehyde is removed by the formation of water, the oxo group of the aldehyde reactant is retained in the reaction product to impart unusual properties thereto.

This invention is directed to the discovery that the reaction product of an amine with a phosphorus sulfide can be converted to a carbonylalkyl derivative by reaction with a carbonyl compound having α,β unsaturation.

It becomes, therefore, a primary object of this invention to provide novel carbonyl-substituted phosphorodiamidodithioate esters.

Another object is to provide a method of preparing carbonyl-substituted phosphorodiamidodithioate esters.

It is another object of the invention to provide oil-soluble, alkoxycarbonylalkyl phosphoroamido esters for use in lubricating oil compositions and a method of preparing same.

Another object of the invention is to provide oil-soluble, carbonyl-substituted phosphorodiamidodithioic esters for use as lubricating oil additives.

An additional object of this invention is to provide a lubricating oil additive having minimum deposit-forming properties which will enhance the load-carrying and antiwear properties of a mineral lubricating oil.

A further object of this invention is to provide a lubricating oil composition having increased load-carrying and antiwear properties.

According to this invention, it has been found that the carbonyl-substituted phosphorodiamidodithioc esters of the general formula,

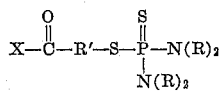

where R groups are hydrogen or alkyl groups containing 1 to 25 carbon atoms, or are aryl groups, alkylaryl or arylalkyl groups containing from 6 to 25 carbon atoms, R' is a divalent alkyl radical containing from 1 to 25 carbon atoms, and X is selected from the group of hydrogen, alkyl groups (including benzyl, methyl, ethyl, propyl, isopropyl, isobutyl, n-butyl, t-butyl, cyclohexyl, and octyl), and alkoxy, amino, alkylamino and dialkylamino groups, are useful as lubricating oil additives. Compounds meeting the foregoing general formula can be formed by the reaction of a phosphoroamido acid with an unsaturated carbonyl compound. In order that the invention may be clearly understood, the general reactants are described and specific examples given.

The phosphorodiamidodithioic acids are prepared by reacting primary or secondary amines with phosphorus pentasulfide. Useful amines include the methylamines, the ethylamines, aniline, m-benzylaniline, p-benzylaniline, benzylamine, propylamine, isopropylamine, dipropylamine, di-isopropylamine, butylamine, dibutylamine, isobutylamine, di-isobutylamine, amylamine, isoamylamine, p-isopropylaniline, dodecylamine, and the like. The reaction between primary or secondary amines and P$_2$S$_5$ results in phosphorodiamidodithioates which may be used as intermediates for preparing the subject compounds. Mixed diamides are obtained when dialkyl amines react with P$_2$S$_5$ at about 130° C.

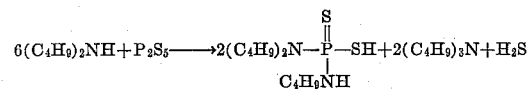

With primary amines, symmetrical diamides can be prepared. Aniline reacts with P$_2$S$_5$ at 30° C. to give N,N'-diphenylphosphorodiamidodithioic acid:

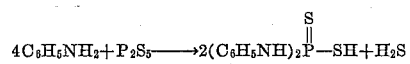

The products resulting from the reaction of the amine with P$_2$S$_5$, after separation and purification, or in their semi-pure state, are treated with an unsaturated conjugated carbonyl compound, of the following formula:

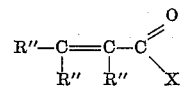

wherein X is a group as heretofore defined and R'' may be hydrogen, or C$_1$ to C$_8$ alkyl groups, including methyl, ethyl, propyl, butyl, isobutyl, pentyl, isopentyl, hexyl, heptyl and octyl, or combinations thereof. The alpha carbon atom may carry a hydrogen atom and the beta carbon atom may carry one or two alkyl groups, or the alpha carbon atom may carry an alkyl group and the beta carbon atom may carry one or two hydrogen atoms. Since X may be hydrogen, an alkyl group, alkoxy group or amino group, etc., the unsaturated conjugated carbonyl compounds included in this invention are of the class of unsaturated aldehydes, unsaturated ketones, unsaturated esters, and the unsaturated amides as general examples. The (R'')$_2$C=C(R'')— group in the above formula, having an upper limit of 25 carbon atoms, becomes R' in the end product through the addition of the dithioic acid. Specific non-limiting examples of unsaturated carbonyl compounds coming within the foregoing general formula are:

Acrolein
Crotonaldehyde
Beta-methylcrotonaldehyde
Alpha-methylcrotonaldehyde
Alpha-methyl-beta-ethylacrolein
Vinyl methyl ketone
Vinyl ethyl ketone
Mesityl oxide
Methyl methacrylate
Benzyl acrylate
n-Butyl acrylate
Cyclohexyl acrylate
Ethyl acrylate
Methyl acrylate
Octyl acrylate
Acrylamide
N-t-Butylacrylamide
N,N-Diethylacrylamide
2-ethylhexyl acrylate From the foregoing illustrations, it is apparent that X in the general formula may also include the methoxy, ethoxy, acetoxy, methylamino, ethylamino, dimethylamino and diethylamino groups as further specific examples.

In order to illustrate the invention, a number of non-limiting examples are given:

EXAMPLE I

N,N'-tri-n-butyl-phosphorodiamidodithioic acid was prepared as follows: One hundred forty-seven g. (1.14 moles) of di-n-butylamine and 20.4 g. (0.092 mole) of phosphorus pentasulfide were charged to a 500 ml. flask equipped with a mercury-sealed stirrer, thermometer, and reflux condenser. As a reaction mixture was stirred, the temperature rose to 80° C. spontaneously, and heat supplied by a heating mantle brought the pot temperature to 160–165° C. The system was refluxed for three hours at this temperature. A white solid product started to form at 145° C. and its production appeared to be complete at the end of this period. The product was washed with methanol and dried. Analysis. — Calc'd. for $C_{12}H_{29}N_2PS_2$: N, 9.5%; P, 10.5%; S, 21.6%. Found: N, 9.3%; P, 10.3%; S, 19.8%. This product was found to increase the wear rate of a base oil in which it was blended and was therefore of no value as an antiwear additive.

EXAMPLE II

The product of Example I was converted to the 2-ethylhexyloxycarbonylethyl ester by addition to 2-ethylhexyl acrylate as follows: Twenty g. (0.07 mole) of the N,N'-tri-n-butyl-phosphorodiamidodithioic acid thus prepared, 18 g. (0.10 mole) of 2-ethylhexyl acrylate, and 200 ml. of toluene were charged to a 500 ml. flask equipped with a mercury-sealed stirrer, thermometer, reflux condenser, and heating mantle. The reaction mixture was stirred and refluxed with a pot temperature of 110–115° C. for twenty-four hours. At the end of this time the solution was completely clear. Under vacuum, the product was stripped with nitrogen to remove solvent.

Analysis of product.—Calc'd. for 86% concentrate of $C_{23}H_{49}N_2O_2PS_2$: N, 5.0 wt. percent; P, 5.5 wt. percent; S, 11.4 wt. percent. Found: N, 4.7 wt. percent; P, 5.1 wt. percent; S, 8.5 wt. percent.

EXAMPLE III

Exactly 142.4 grams (0.59 mole) of di-2-ethylhexylamine and 11.5 g. (0.052 mole) of phosphorus pentasulfide were charged to a 500 ml. flask equipped with heating mantle, motor-driven stirrer, and thermometer. Stirring was applied at once and there was some spontaneous generation of heat. Heat was applied by means of the mantle, and the temperature was raised to 180° C. The temperature was maintained in that range for 45 minutes as stirring continued. The product was a clear liquid with an acidity which indicated that 0.091 mole of acid had been formed (as against 0.104 mole in theory).

EXAMPLE IV

Three hundredths mole of the above acid was charged to a 500 ml. flask equipped with stirrer and a tube for delivering acrolein beneath the liquid surface. Then 18.5 g. (0.34 mole) of acrolein was distilled into the reaction mixture with stirring. There was some generation of heat and marked darkening of the color. The reaction was complete in an hour. The product was vacuum-nitrogen stripped. The product, formylethyl N,N'-tri-2-ethylhexylphosphorodiamidodithioate, could be expected to be diluted with amine and acrolein polymer since neither of these would be completely removed by the stripping employed. Analysis.—Calc. for $C_{26}H_{57}N_2$-$OPS_2$: 5.4 wt. percent N, 6.0 wt. percent P, 12.3 wt. percent S. Found: 3.8 wt. percent N, 1.5 wt. percent P, 2.7 wt. percent S. The S/P/N ratio was 1.9/1/2.9, this indicates the expected amine dilution, as theory would be 2/1/2.

EXAMPLE V

The N-t-octylcarbamylethyl ester of the acid from Example I, another representative compound of our invention, was prepared as follows: Exactly ten g. (0.034 mole) of the acid prepared above and 6.6 g. (0.036 mole) of N-t-octylacrylamide were charged, along with 200 ml. of toluene, to a 500 ml. flask equipped with sealed stirrer, thermometer and a reflux condenser. With heat supplied by a mantle, the reaction mixture was stirred and refluxed at 110° C. for 25 hours. The product was filtered and vacuum-nitrogen stripped.

Analysis of product.—Calculated for $C_{23}H_{50}N_3OPS_2$: N, 8.8 wt. percent; P, 6.5 wt. percent; S, 13.4 wt. percent. Found: N, 7.2 wt. percent; P, 5.6 wt. percent; S, 9.7 wt. percent.

EXAMPLE VI

N,N-tricyclohexylphosphorodiamidodithioic acid was prepared as follows: 160.2 g. (0.88 mole) of dicyclohexylamine and 16.5 g. (0.074 mole) of $P_2S_5$ were charged to a 500 ml. flask equipped with thermometer, mechanical stirrer and heating mantle. The reaction mixture was stirred and heated. At about 80° C. a precipitate began to form. This coagulated as the reaction continued, making stirring very difficult. The reaction was suspended temporarily and the supernatant liquid poured off. The semisolid lower phase was removed and formed a glass-like solid on cooling. The supernatant liquid was returned to the flask and heated to 160° C. with stirring. The solid was pulverized and added at this temperature as stirring continued. After 15 minutes of reaction, the two-phase reaction product was separated while still hot. The lower phase cooled to a glass-like product, which was pulverized. The acid number of this material was 155, near to theoretical for N,N'-tricyclohexylphosphorodiamidodithioic acid, viz., 149.2. The analysis of this product was, calculated: 7.5 wt. percent N; 8.3 wt. percent P; 17.1 wt. percent S. Found: 5.0 wt. percent N; 8.1 wt. percent P; 14.2 wt. percent S.

EXAMPLE VII

The above product was treated with a 1.6 molar portion of 2-ethylhexyl acrylate at 90° C. in toluene solution. A very slow reaction took place, and after 4 days a 60% yield of oil-soluble product was obtained by removal of the liquid phase and solvent stripping with nitrogen.

Although a number of organic phosphorus compounds have been proposed as antiwear additives for lubricating oils, the subject class of compounds has been found to be particularly effective in reducing wear between metal surfaces. In the following table is shown the results of wear tests on two kinds of lubricating blends. Base oil A was composed entirely of extract from manufacture of 85 vis., 100 V.I., neutral oil. Base oil B was composed of 4.8 wt. percent of the above extract, 5.7 wt. percent barium-calcium phenol sulfide-sulfonate detergent additive, 6.4 wt. percent of acrylic polymer (Acryloid #618) and 83.1 wt. percent 170 vis., 100 V.I., neutral oil.

Wear tests were carried out in triplicate on the Four-Ball E. P. machine in which the average wear-scar diameter was determined after a five-minute test at 1800 r.p.m., room temperature, 20 kg. load. The subject compounds are shown to be effective antiwear compounds compared to amine-$P_2S_5$ products before conversion to the carbonyl-substituted ester, or to a commercial metal phosphorodithioate.

Table I

FOUR-BALL WEAR TESTS ON LUBRICATING OILS (5 min., 20 kg., 1,800 r.p.m., room temp.)

[Phosphorus in blend, 0.10 wt. percent]

| Additive Type | Additive Description | Base Oil | Av. Wear Scar Diam. |
|---|---|---|---|
| Products of this invention | Example II | B | 0.261 |
|  | Example IV | A | 0.266 |
|  | Example VII | A | 0.266 |
|  | Example V | B | 0.272 |
|  | Example III | B | 0.311 |
| Amine—P₂S₅ Products | Example I | B | [1] 0.333 |
|  | Example VI | A | [1] 0.486 |
|  | Example I | A | [1] 0.546 |
| Commercial P—S ester | Zinc dialkyl phosphorodithioate. | B | 0.278 |
|  | None | A | 0.505 |
|  | None | B | 0.280 |

[1] Lower phosphorus concentration in blend due to low solubility.

Wear-scar diameters are best interpreted by comparison with the diameter of elastic identation of the balls under the test load. In the case of the tests at 20 kg. load, this diameter is 0.236 mm. and the increase in diameter above this value is an accurate measure of the wear under the test conditions. The above data show that mineral oil alone, or oils containing amine—P₂S₅ products of the phosphorodiamidodithioic acid type, allow relatively high wear rates. Although additives such as commercial phosphorodithioates and others, including those in base oil B, lower the wear rate substantially from that of mineral oil alone, the subject compounds give uniformly still lower wear rates in either base oil.

The foregoing examples described the preparation and use of several carbonyl-substituted phosphoroamidodithioates coming within the broad definition of the invention. The species tested as represented by Examples II, IV, V and VII are the preferred embodiments of the invention. Other examples include:

N-t-octylcarbamylethyl N',N''-tri-n-propylphosphorodiamidodithioate

N-hexylcarbamylethyl N',N''-tri-n-propylphosphorodiamidodithioate

N-diethylcarbamylethyl N',N''-tri-n-butylphosphorodiamidodithioate 2-ethylhexoxycarbonylethyl N',N''-tri-n-butylphosphorodiamidodithioate N-t-octylcarbamylmethyl N',N''-tri-n-propylphosphorodiamidodithioate N-hexylcarbamylmethyl N',N''-tri-isopropylphosphorodiamidodithioate N-t-octylcarbamylethyl N',N''-tricyclohexylphosphorodiamidodithioate 2-acetylethyl N',N''-tri-ethyloctylphosphorodiamidodithioate Carbamylethyl N',N''-tri-n-octylphosphorodiamidodithioate N-t-octylcarbamylethyl N',N'' - tetra-n-octylphosphorodiamidodithioate N-octadecylcarbamylethyl N',N''-tetra-n-propyl phosphorodiamidodithioate N-pentacosylcarbamylethyl N',N''-tri-n-propyl phosphorodiamidodithioate N-octadecylcarbamylethyl N',N'' - tri - pentacosyl phosphorodiamidodithioate N-dodecylcarbamylethyl N',N''-tri-heptadecyl phosphorodiamidodithioate These compounds represent the new and novel compositions of matter of this invention, whether present in a reaction mixture, or in semi-purified or purified form. These new compounds find particular use in lubricating oil compositions as antiwear agents. When used for this purpose, they may be incorporated in the oil in amounts ranging from about 0.1 to 5.0 weight percent. In some applications, less than 0.1 weight percent of the carbonyl-substituted phosphoroamidodithioates may be used and in others more than 5.0% by weight may be necessary or give better results. Some of these compounds have limited oil solubility but are effective when used in an amount sufficient to incorporate about 0.1 weight percent of phosphorus in the total composition. For applications where the appearance of the end composition is not important, the compounds of this invention may be used as suspensions in the oil-carrier or lubricity agent.

As indicated by the wear tests herein, other addends and ingredients may be used with the compounds of this invention, including various lubricating oil addends and different kinds of oil-carriers or lubricity agents. Thus, the compounds of this invention may be incorporated in any lubricating oil, cutting oil, extreme pressure lubricant, grease, aqueous-oil suspension, soluble oil and solid lubricant. The oil-carriers may be various lubricating oil fractions, bright stocks, neutrals or distillates. The addends of this invention may be used with synthetic lubricants. The following table gives the properties of various solvent extracts produced through the manufacture of bright stocks and neutral oils, by way of illustration. This table includes the properties of the specific solvent extract, number 19, used to prepared the formulations tested in Table I.

Table II

SOURCES AND PHYSICAL CHARACTERISTICS OF SOLVENT EXTRACTS

| Extract No. | Crude Source | Solvent | API Gravity | Sp. Gr. at 60° F. | Vis./100° F. | Vis./130° F. | Vis./210° F. | V.I. | Pour | ° F. Flash | ° F. Fire | Iodine No. (Wijs) | Percent C.R. | Percent Sulfur |
|---|---|---|---|---|---|---|---|---|---|---|---|---|---|---|
| 1 | East Texas | Phenol | 11.1 |  | 23,319 | 4,750 | 282 | −40 | +55 |  |  |  | 7.2 | 2.66 |
| 2 | do | do | 15.4 |  | 15,000 |  | 285 | +39 |  |  |  |  |  |  |
| 3 | do | do | 12.6 |  | 36,410 | 4,310 | 310.1 | −1 | +80 |  |  |  | 4.7 | 2.27 |
| 4 | do | do | 14.6 |  | 19,500 | 4,305 | 313 | +27 | +90 |  |  |  | 4.7 | 2.2 |
| 5 | do | do | 15.4 |  | 32,500 |  | 372 | +5 | +60 |  |  |  | 4.13 | 2.33 |
| 6 | do | do | 13.7 |  | 25,000 | 5,400 | 355 | +27 | +80 |  |  |  |  | 2.18 |
| 7 | do | do | 8.6 |  | 145,000 | 19,000 | 616 | 0 | +70 |  |  |  |  |  |
| 8 | do | do | 10.5 |  | 12,676 | 2,514 | 172.1 | −101 | +60 |  |  |  |  | 2.88 |
| 9 | Sante Fe Springs. | do | 10.2 | 0.9984 |  |  | 371 |  | +65 | 520 | 600 | 69.4 |  |  |
| 10 | Texas | Furfural | 13.0 | 0.9791 |  |  | 1,500 |  | +85 | 470 | 515 | 57.1 |  |  |
| 11 | Penn | Chlorex | 12.2 | 0.9843 |  |  | 1,365 |  | +85 | 560 | 630 | 71.4 |  |  |
| 12 | Penn | Nitrobenzene. | 10.0 | 1.000 |  |  | 1,500 |  | +75 | 555 | 640 | 60 |  |  |
| 13 | Mid-Cont | Propane-cresol. | 14.4 | 0.9699 |  |  | 1,500 |  | +100 | 540 | 605 | 63.7 |  |  |
| 14 | do | Phenol | 13.6 |  |  |  | 41.7 | −82 | +20 |  |  |  |  |  |
| 15 | do | Chlorex | 13.6 |  |  |  | 200 | −61 | +75 |  |  |  |  |  |
| 16 | do | Phenol | 8.9 |  |  |  | 569 |  | +75 |  |  |  |  |  |
| 17 | do | Furfural | 14.9 |  |  |  | 50.2 | 25 | +20 |  |  |  |  |  |
| 18 | East Texas | Phenol | 13.5 | .976 | 25,000 |  | 341 | 17 | +65 | 530 | 610 |  | 5.76 | 2.36 |
| 19 | do | do | 17.6 | .949 | 157 | 81 | 40.7 | −16 | +35 | 380 | 440 |  | 0.25 | 1.96 |

The materials described in Table II are all prepared or derived through the solvent extraction of crude lubricating oils in the manufacture of refined oils, i.e., neutrals and bright stocks, as is well known in the art. These materials normally are considered waste products, being the extract phases derived during the solvent extraction and containing a predominance of the aromatic-type constituents as opposed to the paraffinic-type constituents which remain in the raffinate or refined oil. Solvent extracts are not as resistant to oxidation or sludging as the corresponding raffinates and have lower viscosity indices and higher viscosities than the raffinates. Accordingly, in using solvent extracts alone to prepare compositions containing the addends of this invention, these changes in properties must be taken into consideration as concerns their usefulness as a base oil.

Solvent extracts are obtained in the following manner, to give an illustration:

In a typical operation, desalted crude oil is first charged to a distillation unit where straight-run gasoline, two grades of naphtha, kerosene, and virgin distillate are taken off, leaving a reduced crude residue. The reduced crude is continuously charged to a vacuum distillation unit where three lubricating oil distillates are taken off as side streams, a light distillate is taken off as overhead, and a residuum is withdrawn from the bottom of the tower. This residuum is charged to a propane deasphalting unit wherein propane dissolves the desirable lubricating oil constituents and leaves the asphaltic materials. A typical vacuum residuum charge to the propane deasphalting unit may have an API gravity of 12.9°, viscosity SUS at 210° F. of 1249, flash 585° F., fire 650° F., C.R. of 13.9 weight percent and be black in color. The deasphalted oil may have an API gravity of 21.5° to 21.8°, viscosity SUS at 210° F. of 165–175, NPA color 6–7, flash 575° F., fire 640° F., and C.R. of 1.7–2.0. The deasphalted oil and various lubricating oil distillates from the reduced crude are separately subjected to solvent extraction for the separation of non-aromatic from aromatic constituents. The refined oil or "raffinate" from such processes is used per se or as blending stock and the solvent extract, containing predominantly aromatic constituents, is the material that may be used as a part of the base oil.

For example, a crude oil from East Texas with an API gravity of 33.1 was topped to remove such light fractions as gasoline, naphtha, kerosene, and a light lubricating distillate. The vacuum residue was a reduced crude having a viscosity of 1251 SUS at 210° F., 2.2 percent sulfur, and an API gravity of 12.6. After propane deasphalting, the oil had a viscosity of 174 SUS at 210° F., and an API gravity of 21.7. This deasphalted oil was treated with phenol to produce a raffinate from which an aviation lubricating oil may be produced. The extract phase from this phenol treatment, after removal of phenol, is ready for use in preparing compositions in accordance with this invention.

Other solvents than phenol may be used to obtain the extraction product used in accordance with this invention; for example, liquid sulfur dioxide, nitrobenzene, Chlorex, chlorophenol, trichloroethylene, cresylic acid, pyridine, furfural or the Duo-Sol solution comprising liquid propane and cresol may be used. When using phenol, it is possible to vary the characteristics of the extraction product considerably by adjustment of the amount of water present. A lower V.I. can be obtained by using a water solution of phenol during the extraction and a higher V.I. can be obtained by using anhydrous phenol.

The mineral lubricating oil bases which may constitute the whole or part of the carrier for the addends of this invention are derived from any paraffinic, naphthenic, or mixed-base crude oil source as Mid-Continent, Texas, California or Pennsylvania crude oil. Examples of lubricating oil bases are given in Table III.

*Table III*

BASE OILS

| Mineral Oil | API Gravity | COC Flash, °F. | COC Fire, °F. | SUS at 100° F. | SUS at 210° F. | Vis. Index | NPA Color | Percent Carbon Residue | Percent Sulfur | Stable Pour °F. |
|---|---|---|---|---|---|---|---|---|---|---|
| 100 vis Neutral | 33.6 | 405 | 450 | 103.2 | 39.7 | 101 | +2 | 0.00 | 0.12 | +5 |
| 70 vis Neutral | 36.6 | 370 | 405 | 71.3 | 36.9 | 111 | +1 | 0.00 | 0.18 | 0 |
| 150 Bright Stock | 26.8 | 570 | 630 | 2,511 | 156.0 | 99 | 6+ | 0.73 | 0.53 | −5 |
| 170 vis Neutral | 31.2 | 420 | 480 | 177.7 | 45.2 | 101 | 1+ | 0.0 | | 0 |

Other addends may be used in the compositions of this invention, including lubricity agents, pour depressants, VI improvers, oxidation inhibitors and the like. Acryloid #618 is the trade name of an acrylic acid polymer useful as a VI improver. This product is a well-known addend having a molecular weight of about 3000, a specific gravity of about 0.906 (60° F./60° F.), a flash point C.O.C. of about 400° F., a viscosity at 100° F. of about 8000 CS, Neutralization No. of 0.2 and ASTM color of 3. The physical properties of other Acryloid lubricating oil additives are given in Table IV.

*Table IV*

| Property | Acryloid No. | |
|---|---|---|
| | 710 and 788 | 763 |
| Sp. Gr., 60° F./60° F. | 0.906 | 0.901 |
| Lbs./gal | 7.54 | 7.50 |
| Flash Point, C.O.C., °F.[1] | 400 | 400 |
| ASTM, Pour Point, °F.[2] | +25 | +25 |
| Viscosity, cs./100° F | 9,400 | 7,200 |
| Viscosity, SUS/100° F | 43,000 | 33,000 |
| Viscosity, cs./210° F | 800 | 800 |
| Viscosity, SUS/210° F | 3,700 | 3,700 |
| Color, ASTM | 3 | 3 |
| Neut. No | 0.2 | 0.2 |

[1] When diluted with three parts of a 400° F. flash mineral oil to decrease the viscosity and prevent local overheating and cracking.
[2] Viscosity Pour Point.

The detergent-antioxidant that is included in the formulations tested herein is known under the trade name of Paranox 65. Broadly, addends of this type comprise about 65% by weight of a phenol sulfide salt and an alkali earth metal sulfonate combination with about 35% mineral oil carrier. The active ingredients comprise about 80% by weight of a phenol sulfide salt and 20% of the sulfonate. As described in United States Patents 2,379,241 and 2,761,845, these anti-oxidant-detergents are oil-soluble metal salts of an alkylated hydroxy aryl sulfide mixed with alkaline earth metal petroleum sulfonates. The active ingredients in Paranox 65 comprise 65% of a mixture of barium salt of hydroxy diisobutyl phenyl sulfide and calcium petroleum sulfonate with a mineral oil, wherein the proportions of the sulfide salt to sulfonate are 80/20, as before stated. Paranox 65 has the following physical properties:

*Table V*

TYPICAL PHYSICAL PROPERTIES OF PARANOX 65

| Physical characteristic: | Value |
|---|---|
| Viscosity @ 210° F. SSU | 106.5 |
| Flash point, ° F. | 425 |
| Pour point, ° F. | 10 |
| Specific gravity, 60/60° F. | 1.0136 |
| Weight, avg. lb./gal. @ 60° F. | 8.5 |
| Barium, wt. percent | 7.73 |
| Calcium, wt. percent | 0.6 |
| Sulfur, wt. percent | 12.71 |
| Ash, wt. percent | 14.9 |
| Sulfated Ash, wt. percent | 15.4 |
| Conradson Carbon, wt. percent | 16.7 |
| Neutralization No. ASTEM (Base No.) | 58 |
| Acid No. | 2.3 |

What is claimed is:

1. A new composition of matter comprising carbonyl-substituted alkyl N,N'-trialkylphosphorodiamidodithioates ethylhexyloxy radicals.

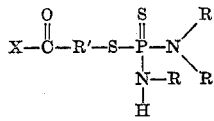

wherein R is an alkyl group having 3 to 25 carbon atoms to the molecule, R' is of the group consisting of methylene and ethylene groups, and X is of the group consisting of hydrogen, acetyl, amino, diethylamino, hexylamino, t-octylamino, dodecylamino, pentacosylamino, and 2-ethyl-hexyloxy radicals.

2. A new composition of matter in accordance with claim 1 in which R' is an ethylene group.

3. A new composition of matter in accordance with claim 1 in which X is a 2-ethylhexyloxy group.

4. A new composition of matter in accordance with claim 1 in which X is hydrogen.

5. A new composition of matter in accordance with claim 1 in which X is an amino group.

6. A new composition of matter in accordance with claim 1 in which X is a t-octylamino group.

7. A new composition of matter in accordance with claim 1 in which X is a diethylamino group.

8. 2-ethylhexyloxycarbonylethyl - N,N' - trialkylphosphorodiamidodithioates wherein the alkyl radicals contain 3 to 25 carbon atoms.

9. 2 - ethylhexyloxycarbonylmethyl-N,N'-trialkylphosphorodiamidodithioates wherein the alkyl radicals contain 3 to 25 carbon atoms.

10. Formylethyl - N,N' - trialkylphosphorodiamidodithioates wherein the alkyl radicals contain 3 to 25 carbon atoms.

11. Formylmethyl - N,N' - trialkylphosphorodiamidodithioates wherein the alkyl radicals contain 3 to 25 carbon atoms.

12. N - t - octylcarbamylethyl-N,N'-trialkylphosphorodiamidodithioates wherein the alkyl radicals contain 3 to 25 carbon atoms.

13. N - t - octylcarbamylmethyl-N,N'-trialkylphosphorodiamidodithioates wherein the alkyl radicals contain 3 to 25 carbon atoms.

14. 2 - ethylhexyloxycarbonylethyl-N,N'-tricycloalkylphosphorodiamidodithioates wherein the tricycloalkyl radicals contain 3 to 25 carbon atoms.

15. 2-ethylhexyloxycarbonylmethyl - N,N' - tricycloalkylphosphorodiamidodithioates wherein the tricycloalkyl radicals contain 3 to 25 carbon atoms.

16. N - t - octylcarbamylmethyl-N,N'-tri-n-propylphosphorodiamidodithioate.

17. A new composition of matter comprising ethylhexyloxycarbonylethyl N,N' - tricyclohexyl phosphorodiamidodithioate.

18. A new composition of matter comprising 2-ethylhexyloxycarbonylethyl N,N'-tri-n-butylphosphorodiamidodithioate.

19. A new composition of matter comprising formylethyl N,N'-tri-2-ethylhexylphosphorodiamidodithioate.

20. A new composition of matter comprising N-t-octylcarbamylethyl N',N''- tri - n - butylphosphorodiamidodithioate.

References Cited in the file of this patent

UNITED STATES PATENTS

| 2,742,431 | Bishop | Apr. 17, 1956 |
| 2,798,086 | Coover et al. | July 2, 1957 |
| 2,881,201 | Schrader | Apr. 7, 1959 |

UNITED STATES PATENT OFFICE
CERTIFICATE OF CORRECTION

Patent No. 2,996,532 August 15, 1961

Allen F. Millikan et al.

It is hereby certified that error appears in the above numbered patent requiring correction and that the said Letters Patent should read as corrected below.

Column 5, line 24, for "identation" read -- indentation --; column 7, line 35, for "straight-rum" read -- straight-run --; column 9, line 24, for "ethylhexyloxy radicals." read -- of the general formula: --.

Signed and sealed this 27th day of February 1962.

(SEAL)
Attest:

ERNEST W. SWIDER
Attesting Officer

DAVID L. LADD
Commissioner of Patents